(12) United States Patent
Ke et al.

(10) Patent No.: US 8,289,995 B2
(45) Date of Patent: Oct. 16, 2012

(54) METHOD FOR TRANSMITTING MOBILE MULTIMEDIA BROADCAST ELECTRONIC SERVICE GUIDE

(75) Inventors: Zunyou Ke, Shenzhen (CN); Hailong Wen, Shenzhen (CN); Qinghua Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 381 days.

(21) Appl. No.: 12/532,110

(22) PCT Filed: Dec. 29, 2007

(86) PCT No.: PCT/CN2007/003940
§ 371 (c)(1),
(2), (4) Date: Sep. 18, 2009

(87) PCT Pub. No.: WO2008/113237
PCT Pub. Date: Sep. 25, 2008

(65) Prior Publication Data
US 2010/0115551 A1 May 6, 2010

(30) Foreign Application Priority Data

Mar. 21, 2007 (CN) .......................... 2007 1 0073625

(51) Int. Cl.
*H04N 5/445* (2011.01)
(52) U.S. Cl. ........................... 370/473; 725/39; 370/329
(58) Field of Classification Search .................... 725/39; 370/270, 328, 329, 338, 473
See application file for complete search history.

(56) References Cited

U.S. PATENT DOCUMENTS

| | | | |
|---|---|---|---|
| 7,903,574 B2 * | 3/2011 | Vare et al. | 370/252 |
| 2005/0163083 A1 * | 7/2005 | Mantravadi et al. | 370/335 |
| 2006/0193337 A1 * | 8/2006 | Paila et al. | 370/432 |
| 2008/0005767 A1 * | 1/2008 | Seo | 725/62 |

FOREIGN PATENT DOCUMENTS

| | | |
|---|---|---|
| WO | 2006031925 A2 | 3/2006 |
| WO | 2006/100571 A1 | 9/2006 |
| WO | 2007052109 A1 | 5/2007 |

OTHER PUBLICATIONS

International Search Report (PCT/USA/210), PCT/CN2007/003940, Apr. 3, 2008.

(Continued)

*Primary Examiner* — Kieu Oanh T Bui
(74) *Attorney, Agent, or Firm* — James W. Kayden

(57) ABSTRACT

A method for transmitting mobile multimedia broadcast electronic service guide, and the method comprises: a multiplexer receives the electronic service guide message; the multiplexer multiplexes the electronic service guide message into a multiplexing frame, the multiplexing payload of the multiplexing frame includes one or more multiplexing sub-frames; the multiplexer sends the multiplexing frame to a broadcast station; the broadcast station modulates and sends said multiplexing frame to the mobile user equipments. The method of the present invention could transmits the ESG data alone in the individual service multiplexing sub-frames, thus transmits a large number of ESG messages rapidly; alternatively, the relative ESG messages can be transmitted along with the audio/video data, thus the user equipments can receive the service data and this ESG messages simultaneously when the user equipments open only one time slot.

17 Claims, 3 Drawing Sheets

OTHER PUBLICATIONS

"Mobile Multimedia Broadcasting, Part 2: Multiplexing", Standard for Radio Film and Television Industry in P.R. China, GY/T 220.2-2006, Nov. 29, 2006.

Russian Office Action mailed Dec. 2, 2010, Application No. RU 2009136910/09(042170), filed Dec. 29, 2007.

"Digital Video Broadcasting (DVB); IP Datacast over DVB-H: Electronic Service Guide (ESG)", ETSI TST 102 471, V1.2.1, European Telecommunications Standards Institute, Sophia Antipolis Cedex—France, Nov. 2006.

"Digital Video Broadcasting (DVB); DVB-H Implementation Guidelines", ESTI TR 102 377, V1.2.1, European Telecommunications Standards Institute, Sophia Antipolis Cedex—France, Nov. 2005.

* cited by examiner

METHOD FOR TRANSMITTING MOBILE MULTIMEDIA BROADCAST ELECTRONIC SERVICE GUIDE

CROSS REFERENCE RELATED APPLICATIONS

This application is a national phase of PCT/CN2007/003940 filed Dec. 29, 2007, which claims priority to China Application Serial No. 200710073625.0 filed Mar. 21, 2007, which is entirely incorporated herein by reference.

TECHNICAL FIELD

The present invention relates to the mobile multimedia broadcast technology, and more specifically, to a method for transmitting mobile multimedia broadcast electronic service guide.

BACKGROUND

One typical application of the mobile multimedia broadcast technology is mobile TV service, which can exploit the network capability to the largest extent by providing plenty services as far as the mobile operators are concerned; and the mobile TV service is a new channel of TV broadcast which can fully take advantage of the content resource and extend the user scope so as to achieve the mobility of the broadcasting network as far as the broadcasters are concerned. In 2006, the number of cell phone subscribers in China has been close to 400,000,000, and the number of families having televisions has reached about 350,000,000. It can be imagined that the mobile TV service as a product of the combination of cell phone service and TV service will created a huge consumer market. According to the predication of foreign countries, there will be 120,000,000 mobile TV subscribers in the world in 2010, and the number of subscribers in our country will reach 40,000,000. Facing such a huge mobile and broadcast TV user groups, the network operators and equipment manufacturers in each country pay great attention to this service and hope it to be the new growth pole of mobile multimedia service. Therefore, compared with the related industries in China, mobile TV is a god-given opportunity for development and also a golden opportunity for independent innovation.

As an innovative multimedia service, the mobile TV's implementation is the result of combining several technologies, and in summary, there are mainly three technologies: downlink transmission technology, uplink interaction technology and service layer implementation technology.

The downlink transmission technology is the key point to implement this service, and it is responsible for transmitting the information and content of TV programs to the subscribers. This technology obtains a lot of attention in the industry, and there are a variety of methods for implementing this technology, and in summary, there are generally three kinds of methods for implementing different downlink transmission technologies: (1) the method based on the mobile network technology; (2) the method based on the satellite transmission technology; (3) the method based on the method for implementing the ground digital broadcasting network technology.

For the third method, the technology used in the implementation is based on the ground digital broadcast TV transmission technology, and the frequency in use is the broadcast TV frequency band. In order to adapt to the feature of mobile user equipment, some technologies are developed to be mobile TV technology based on the prior art, while some other technologies are designed for both ground digital broadcast TV systems and mobile TV systems. This kind of technologies receive much more worldwide interest and also has the most number of schemes, whose typical technologies comprise DVB-H in Europe, MEDIAFLO in USA, T-DMB in Korea and ISDB-T in Japan etc. Wherein, the two technologies in occident are designed specifically for the mobile stations, while the two in Japan and Korea can be used in both mobile stations and digital TV. Tsinghua University and Shanghai Jiao Tong University in China have respectively studied the technology in China based on the digital TV standards, such as DMB-TH and ADTB-T. In addition, Beijing Nufront Technology Co., Ltd also developed one ground mobile multimedia broadcast technology T-MMB on the basis of the DAB technology in Europe.

The data information included in the mobile multimedia broadcast electronic service guide (ESG) message mainly has: service information, service extension information, content information, service parameter information and arrangement information. How to flexibly use the service channel to multiplex and transmit ESG message is the problem to be solved at present.

SUMMARY OF THE INVENTION

The present invention offers a method for transmitting the mobile multimedia broadcast ESG to implement the ESG message transmission, thus provides a convenient basis for a flexible ESG message transmission by the mobile multimedia broadcast system and also for the service application development of the mobile multimedia broadcast system.

In order to solve the above technical problem, the present invention offers a method for transmitting the mobile multimedia broadcast ESG message, and the method comprises the following steps:

(a) The multiplexer receives the ESG message;

(b) The multiplexer multiplexes the ESG message into the multiplexing frame, and the multiplexing payload of said multiplexing frame comprises one or more multiplexing sub-frames;

(c) The multiplexer sends said multiplexing frame to the broadcast station;

(d) The broadcast station modulates and sends said multiplexing frame to the user equipments.

Furthermore, said ESG message comprises the ESG data and ESG basic description table.

Furthermore, said multiplexing frame is used to carry the service or control information, and each said multiplexing frame is assigned with a multiplexing frame ID which corresponds to a control or service logical channel.

Furthermore, in step (b), the multiplexer multiplexes said ESG data into the multiplexing frame carrying service information, and the multiplexing sub-frames of the multiplexing frame comprise sub-frame header and data segment, and said data segment comprises data segment header including the number of data units and CRC code, and several data units including data segment header and several data units, and the parameters of data units, including the type of each data unit and its length information, are written into said data segment header or in front of each data unit.

Furthermore, said ESG data is transmitted using individual multiplexing sub-frame, and/or transmitted along with video/audio data in multiplexing sub-frames, and the header of the multiplexing sub-frame indicates whether or not the multiplexing sub-frame comprises the audio/video segment or data segment.

Furthermore, said ESG data comprises the service information, service extension information, arrangement information, content information and service parameter information; The ESG data transmitted at one time is the entire or part of the data record in all or part of the ESG data types, and a ESG data type ID is used in the header of the corresponding data unit to identify the type of ESG data carried in said data payload.

Furthermore, said data unit comprises header, payload and CRC code, and in said step (b), when the data length of said ESG message is larger than the maximum data payload length of said data unit, said ESG data is divided into different data segments which use different user units to encapsulate and send, and the segment serial number of the ESG data in the local data unit and the total number of segments divided are indicated in the header of each data unit.

Furthermore, in said step (b), the ESG data is compressed and the encoding type used in the compression is indicated in said data header; in said step (d), said user equipments decode the data according to the encoding type.

Furthermore, in said step (b), said ESG data are divided into several ESG data blocks which are distinguished by adding data block IDs into the ESG header, and the rule for dividing the data blocks is dividing according to the play time, and use the data payload of said data unit to transmit the ESG data.

Furthermore, in said step (b), the multiplexer multiplexes said ESG basic description tables into the multiplexing frame carrying the control information, and the multiplexing payload of this multiplexing frame comprises one or more control information tables, each of which comprises at least one said ESG basic description table applied to describe the configuration of multiplexing sub-frames which transmit the ESG data.

Furthermore, said ESG basic description table comprises one or more of the following segments: table ID, ESG update serial number, segment length, segment serial number, the number of segments, network level, network number, local time offset, character encoding type, the number of ESG service logical channels, ESG service logical channel description, the number of ESG data types, ESG data type description and CRC code_32.

Furthermore, said ESG service logical channel description comprises one or more of the following segments: index ID, ESG service ID; said ESG data type description comprises one or more of the following segments: ESG data type ID, the number of data blocks and data block description.

Furthermore, said data block description comprises one or more of the following segments: data block ID, data block version number, ESG service logical channel index ID.

Furthermore, the multiplexing period of said multiplexer is one second which is divided into 40 time slots, the multiplexing frame and time slot mapping in the service and control logical channels are decided by the system configuration, and the range of said multiplexing frame ID is 0~39, and 39 is the maximum value, wherein, the multiplexing frames whose ID is 0 are mapped to the control logical channel, while other multiplexing frames are mapped to the service logical channel.

Furthermore, said ESG data alone use the multiplexing frames in the service logical channel to transmit; or alternatively, said ESG data along with the ESG basic description table use the multiplexing frames in the control logical channel to transmit; or some ESG data use the multiplexing frames in the control logical channel to transmit, while others use the multiplexing frames in the service logical channel to transmit.

Different from other method, such as DVB-H and MEDIA-FLO, for transmitting the ESG message, this method mainly offers a solution for the ESG transmission in the mobile multimedia broadcast multiplex transmission system. All methods achieve the function of ESG transmission in their own system. The present invention can make the ESG message transmit alone or along with the video/audio data in the service channel, thus offers a very convenient basis for the mobile multimedia broadcast system to flexibly transmit the ESG and to develop the service application.

THE PREFERRED EMBODIMENTS OF THE PRESENT INVENTION

The present invention will be described in detail with combination of the accompanying figures and embodiments.

Figure 1:
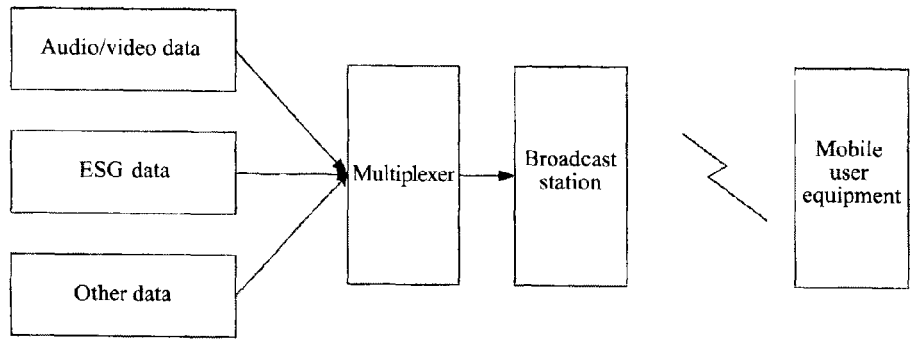
FIG. 1 is an illustration of the overall structure of the mobile multimedia broadcast system in accordance with the present invention.

As shown in FIG. 1, the logical entities of this method comprise the multiplexer, broadcast station and mobile user equipments.

The multiplexer obtains ESG and other audio/video data, multiplexes the related ESG data into the logical channel and sends them to the broadcast station for modulation and transmission.

The broadcast station modulates and transmits the multiplexed data

The mobile user equipment (UE), including mobile communication equipments such as the cell phone, receives, buffers, updates, searches and displays the data, such as ESG message, transmitted through the broadcast network channel.

The method for transmitting the mobile multimedia broadcast ESG comprises the following steps:

(1) The multiplexer receives the ESG message;

(2) The multiplexer multiplexes the ESG message into the designated multiplexing frame, wherein the multiplexing frame can be the multiplexing frame carrying the control information or that carrying the service information;

(3) The multiplexer sends the multiplexing frame to the broadcast station;

(4) The broadcast station modulates and sends the multiplexing frame to the mobile UE.

Said mobile UE receives the data sent by the broadcast station and demodulates the data, thus the subscribers can use the UE to obtain and display ESG message, thus find and use the service.

The above multiplexed ESG message comprises the ESG data and ESG basic description table, and the ESG data in the specification comprise the ESG data in XML format. The data examples described by these data elements comprise: the service table, service extension information table, content table, service parameter table and arrangement table. However, the present invention is not limited to this format.

The multiplexing system in the present invention applies the time division multiplexing based on the frequency.

Figure 2:
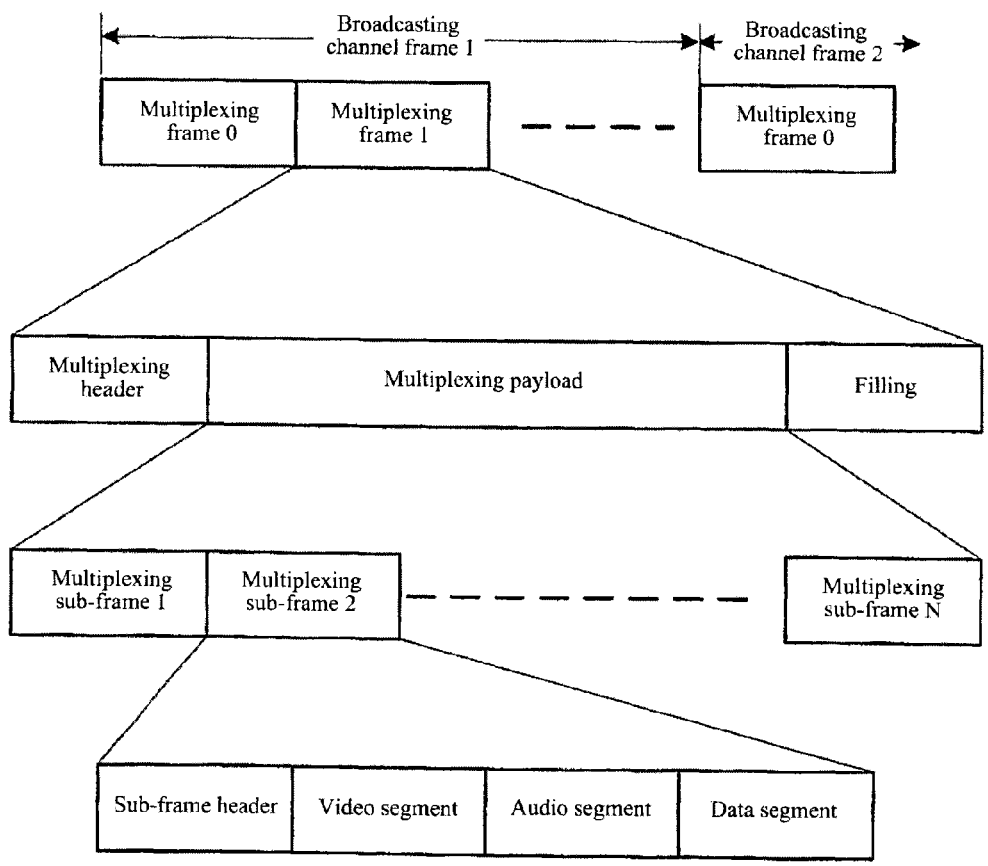
FIG. 2 is an illustration of the service channel multiplexing structure in accordance with an embodiment of the present invention.

As shown in FIG. 2, several multiplexing frames consist in a broadcast channel frame, and each multiplexing frame includes the header, payload and filling part.

For example, presume one second is the multiplexing period which is divided into 40 time segments (time slot), thus the multiplexing unit is 25 ms. The logical multiplexing frames and time slot mapping are decided by the system configuration.

One multiplexing frame corresponds to a control or service logic channel, and each multiplexing frame is assigned with a multiplexing frame identity MF_ID whose range is 0 to 39 with 39 as the maximum MF_ID, wherein the multiplexing frames whose MF_ID==0 are mapped to the control logical channel.

There are two kinds of multiplexing frames: (1) multiplexing frames whose MF_ID==0 are used to transmit the system control information; (2) multiplexing frames whose MF_ID!=0 are used to transmit the service information. In the following, the structure of these two kinds of frames will be described in detail.

The multiplexing payload of the multiplexing frames whose MF_ID!=0 generally consists of the multiplexing sub-frames of several kinds of data, and the multiplexing sub-frames have different functions, such as transmitting different TV channels, configuration control information or ESG message. The number of multiplexing sub-frames is 1 to 15. This kind of multiplexing sub-frames comprises the header, video segment, audio segment and data segment, or one or two of them, and the header of the multiplexing sub-frame is used to indicate whether there is audio segment, video segment or data segment in the multiplexing sub-frames in the service channel or not.

For the methods for multiplexing the ESG message, when multiplexing it into the multiplexing frame carrying the service information, an individual multiplexing sub-frame can be used to transmit the ESG data alone, that is, there is no audio and video segments in the multiplexing sub-frame and the data segment only transmits the ESG data. Alternatively, the related ESG message is transmitted along with the audio/video data in the multiplexing sub-frame, that is, concomitant channel transmission; or both methods are applied in different multiplexing sub-frames simultaneously.

Figure 3:
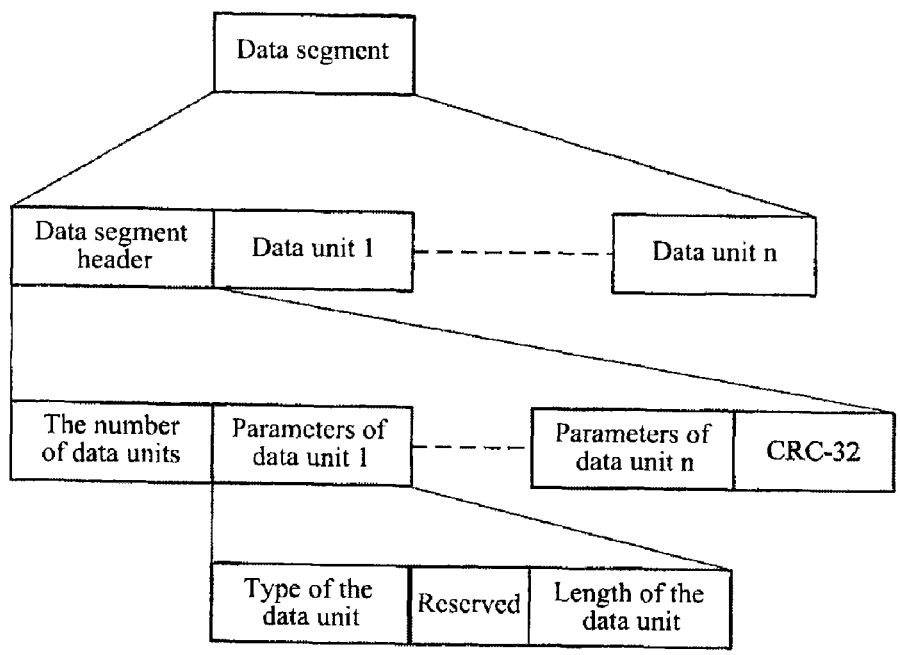
FIG. 3 is an illustration of the structure of a data segment (MF_ID !=0) in the multiplexing sub-frame shown in FIG. 2.

As shown in FIG. 3, the data segment might include several kinds of content, and it has a header and several data units, and the header defines the number of data units, the data unit parameters and CRC code, wherein the data unit parameters include descriptions of the type and length of each data unit. The data unit parameters can be divided into segments which are put into the front of corresponding data units separately rather than put together, here, a particular data type value is defined to identify that it is ESG data in the data unit, and this kind of data units is also referred to as the ESG data unit in the following description.

Since the length of the ESG data payload of one ESG data unit is finite, the system generally sets the length to be the maximum value, such as 64 Kbytes. When the size of one ESG data unit is not big enough to transmit the ESG data, the data should be segmented, that is, the well-processed ESG data block is divided into different data segments to be as the ESG data payload of a certain ESG data unit and different segments which are transmitted by different ESG data units. For the formatted data, if they are segmented during the transmission, the UE won't analyze the data unless all segments are received. Moreover, in order to improve the transmission efficiency, the ESG data should be compressed to be sent.

Figure 4:
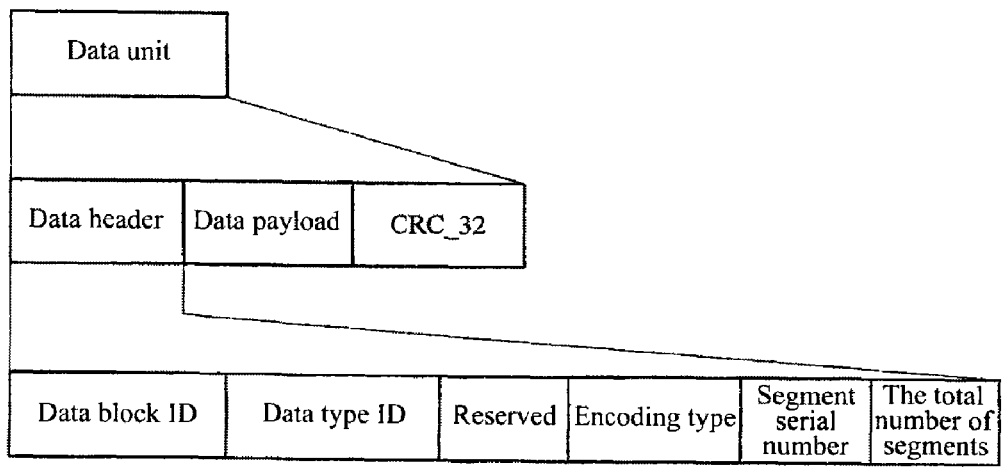
FIG. 4 is an illustration of the structure of ESG data unit in accordance with an embodiment of the present invention.

The ESG data units are encapsulated into the data segments, and in this embodiment, the structure of the ESG data unit is shown as FIG. 4, which comprises header, payload and CRC code.

The header of data comprises the following segments: data block ID, ESG data type ID, encoding type, segment serial number and the total number of segments. Wherein:

The data block ID is used to represent the data block to which the ESG data payload belongs. When there are several ESG data blocks in the system (for instance, ESG in today is an ESG data block, and ESG in other time of one week is another ESG data block) to be played one by one, they should be distinguish by using the data block ID in the ESG table header. Each data block can be obtained through combining different types of ESG data, for example, all kinds of ESG data which should be broadcasted during the day are combined to be a data block.

The ESG data type ID indicates the type of the ESG data carried in the data payload, and the ESG data type in this embodiment means the ESG data table to which the data in the ESG data payload belongs. Define a table ID constant list and use the table ID in the list as the ESG data type ID here. The table ID and data block ID uniquely determine a data block to which a data segment belongs.

The encoding type means the compressed encoding type used by the ESG data payload, which can be defined by a field of three bits, refer to table 1.

TABLE 1

| Encoding type | |
| --- | --- |
| Value (b2b1b0) | Type |
| 000 | No compression |
| 001 | GZIP compression |
| 010~111 | Reserved |

Wherein, the GZIP compressed encoding is compressed with the GZIP compression algorithm, refer to IETF RFC 1952.

The segment serial number is used to indicate the serial number of the segment carrying the to-be-transmitted data. That is, it indicates which data segment of its ESG data block is transmitted by the ESG data payload. The segment serial number is a number for these data segments, whose minimal value is 1 and the maximal one is the total number of data segments in the ESG table header.

The total number of segments indicates the total number of segments for carrying the to-be-transmitted data. That is, it indicates how many data segments are divided to be multiplexed and sent when the ESG is transmitted in the ESG data unit. It also means how many ESG data payloads the ESG data are divided into, and they need how many data units to transmit.

The length of ESG data payload can be derived by using the length of the ESG data unit and that of the ESG table header, that is: the length of data unit−(the length of ESG header+the length of CRC code). Wherein, the length of the ESG header and that of CRC code are fixed values.

Figure 5:
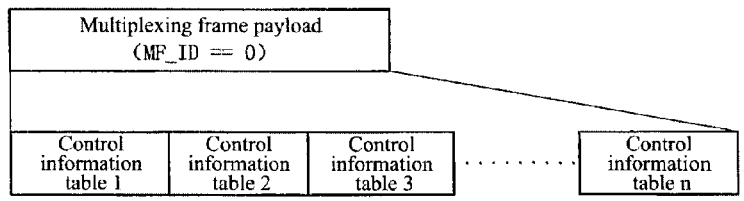
FIG. 5 is an illustration of the structure of multiplexing frame payload in the multiplexing frame (MF_ID==0) in accordance to an embodiment of the present invention.

The multiplexing frames whose ID is MF_ID==0 in the header of multiplexing frames are used to carry the control information, as shown in FIG. 5, the multiplexing frame payload in this multiplexing frame comprises several control information tables, and each multiplexing sub-frame composes of one control information table. During the transmission, due to the difference of each ESG table data in applications, the real-time requirement and the amount of data, the requirements for the transmission repetitive rate (frequency) of each table data by the broadcasting system are different. Therefore, the system generally creates the ESG data into different tables and schedules and transmits the data respectively. Therefore, the data in several ESG tables are transmitted by using different ESG data units, and the ESG information transmitted at one time is the total or part of the data record in the total or part of tables. The data in the same ESG table are generally sent in one data unit, except that it is too big and needs to be segmented.

Figure 6:
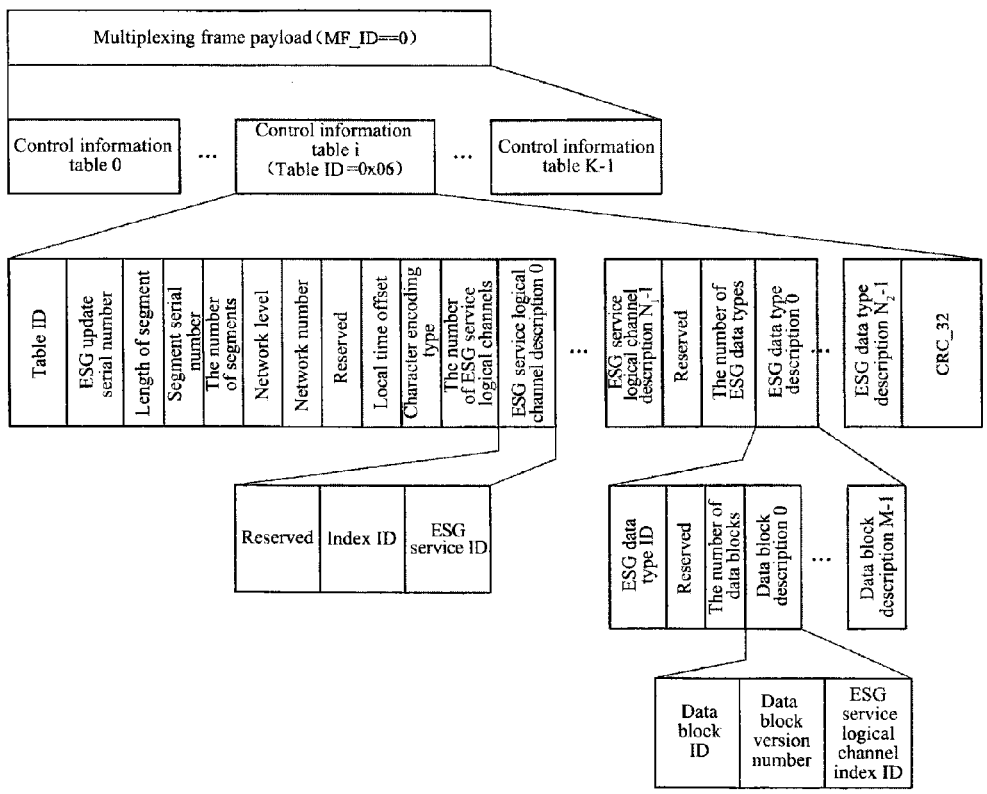
FIG. 6 is an illustration of the structure of ESG basic description table in accordance with an embodiment of the present invention.

The present embodiment multiplexes the above ESG data into the multiplexing frames in the service logical channel to transmit. In other embodiments of the present invention, the ESG data is multiplexed along with the ESG basic description table into the multiplexing frame carrying the control information. That is, the ESG information, including the ESG data and ESG basic description table, uses the multiplexing frame in the control logical channel to transmit. The ESG basic description table is one kind of control information table, and the data in the table describes the configuration of multiplexing sub-frames transmitting the ESG data, including the ESG service logical channel description, the number of ESG data types, the ESG data type parameters and the ESG table parameters. FIG. 6 shows the deployable structure of the ESG basic description table, different from the structure of the above-mentioned ESG data unit or the multiplexing sub-frame, it writes the above content directly into the multiplexing frame whose MF_ID==0, and the data in one table, as a special multiplexing sub-frame, is not encapsulated into the multiplexing sub-frames and data unit structure shown in FIG. 2~FIG. 4. The ESG service logical channel in this table means the service logical channel transmitting the ESG data and the ESG service logical channel is mapped to one or several multiplexing sub-frames of the 1~39# multiplexing frames.

As shown in FIG. 6, the ESG basic description table comprises the following content:

The table ID is a field of 8 bits; please refer to GY/T220.2-2006 table 2 for the assignment of ID of the basic description table.

The ESG updated serial number is a field of four bits, value range is 0~15, and it indicates the current update serial number of the basic description table, and when the information in the basic description table changes, the ESG update serial number steadily adds by one.

The length of segment is a field of 12 bits, value range is 0~4095, and it represents the length of the basic description table, include the table ID while not the CRC code_32 segment, in bit.

The segment serial number is a field of 4 bits, value range is 0~14, it represents the segment serial number of the basic description table.

The number of segments is a field of 4 bits, value range is 1~15, it represents the number of segments divided in the basic description table.

The network level is a field of 4 bits; please refer to GY/T220.2-2006 table 4 for its definition.

The network number is a field of 12 bits; please refer to GY/T220.2-2006 table 3 for its definition.

The local time offset is a field of 6 bits, the highest bit indicates the polarity of the time zone, when it sets as "0", it means that the local time is earlier than the UTC time (generally at the east of Greenwich), and when it sets as "1", it means that the local time is later than the UTC time. The last five bits means the amount of time offset, value range 0~24, unit in 0.5 hour.

The character encoding type is a field of 4 bits, and it indicates the encoding character set applied by the ESG text by default. In other parts of this specification, it applies the encoding character set designated by this segment unless otherwise instructed.

The number of ESG service logical channels is a field of 4 bits, value range is 1~5, it represents the value of subsequent loop body N1.

$N_1$ ESG service logical channel descriptions, following the number of the ESG service logical channels and including the index ID and ESG service ID, establishes the ESG service ID index table according to said index ID. Wherein, the ESG service ID is a field of 16 bits and represents the service ID of the ESG service logical channels.

The number of ESG data types is a field of 4 bits, value range is 0~15, it represents the value of the subsequent loop body $N_2$.

$N_2$ ESG data type descriptions (or referred to as the ESG data type parameters) follows the number of ESG data types, and each ESG data type description also comprises the ESG data type ID, the number of data blocks and several data block descriptions. In turn, the data block description comprises the data block ID, the data block version number and the ESG service logical channel index ID.

The ESG data type ID is a field of 4 bits and it indicates the ESG data type carried by the ESG data payload, refer to table 2, one ESG data type corresponds to one or more EST data tables.

TABLE 2

| ESG data type | |
|---|---|
| Value (b3b2b1b0) | Type |
| 0000 | Reserved |
| 0001 | Service |
| 0010 | Service expansion |
| 0011 | Arrangement |
| 0100 | Content |
| 0101 | Service parameter |
| 0110~1111 | Reserved |

The number of data block is a field of 8 bits, value range is 0~255, it represents the value of the subsequent loop body M.

The data block ID is a field of 8 bits and it represents the data block to which the ESG data payload belongs. The data block ID along with the ESG data type ID uniquely determines one data block.

The data block version number is a field of 4 bits and it represents the current version number of the data block, value range is 0~15, adding by 1 when there is change in the data block.

The ESG service logical channel index ID is a field of 4 bits, it is the index value, and the service ID of the ESG service logical channel is obtained according to the ESG service ID index table established in the above context.

The ESG service logical channel index number is the index ID in the above-mentioned ESG service logical description table.

The CRC code_32 is a field of 32 bits, and please refer to GY/T 220.2-2006 appendix A for the CRC code_32 decoding model.

To sum up, the ESG transmission method in the present invention can transmit the related ESG information of the multiplexing sub-frames along with the video and audio data, thus to make the user equipments can receive both the service data and the ESG information in the condition that only one time slot is activated. The present invention uses an individual service multiplexing sub-frame to transmit the ESG data, and transmit a large amount of ESG information at a relatively fast speed, and this method can be used to play the complete ESG data information (such as one week ESG) one by one, and when the user equipments enable the mobile multimedia application, it generally requests to receive the complete ESG data information first; alternatively, the ESG data can be transmitted along with the basic description table by using the multiplexing frames of the control logical channel.

All in all, since the present invention can flexibly use the service channel to multiplex and transmit the ESG messages, it offers large flexibility for the ESG transmission in the mobile multimedia broadcast system and service applications.

INDUSTRIAL APPLICABILITY

The present invention offers a method for ESG transmission in the mobile broadcast multiplex transmission system to make the ESG message can transmit along with the audio/video data in the service channel, or transmit alone in the service or control channel, thus offer a great convenient basis for the mobile multimedia broadcast system flexibly transmitting the ESG messages and for the service applications development.

What we claim is:

1. A method for transmitting a mobile multimedia broadcast electronic service guide message, comprising the following steps of:
   (a) receiving by a multiplexer an electronic service guide message;
   (b) multiplexing by the multiplexer the electronic service guide message into a multiplexing frame, and a multiplexing payload of said multiplexing frame comprising one or more multiplexing sub-frames;
   (c) sending by the multiplexer said multiplexing frame to a broadcast station; and
   (d) modulating said multiplexing frame and sending modulated data by the broadcast station to user equipments through a broadcast network channel;
   wherein said electronic service guide message comprises an electronic service guide data and electronic service guide basic description table; and
   in step (b), the multiplexer multiplexes said electronic service guide basic description table into the multiplexing frame carrying control data, which is mapped to a control logical channel.

2. A method of claim 1, wherein:
each said multiplexing frame is assigned with a multiplexing frame identifier to identify whether the multiplexing frame-is mapped to a control logical channel or service logical channel.

3. A method of claim 2, wherein:
in step (b), the multiplexer multiplexes said electronic service guide data into the multiplexing frame carrying service data, the multiplexing sub-frame of the multiplexing frame carrying service data comprises a sub-frame header and a data segment, said data segment comprises a data segment header and a plurality of data units, the data segment header includes the number of the data units and a cyclic redundancy check code, and parameters of the data units, including a type and a length information of each of the data units, are written into said data segment header or in the beginning of each of the data units.

4. A method of claim 3, wherein:
said electronic service guide data is transmitted using an individual multiplexing sub-frame, and/or transmitted along with video/audio data in multiplexing sub-frames, and the sub-frame header of the multiplexing sub-frame indicates whether or not the multiplexing sub-frame comprises an audio segment, video segment or data segment.

5. A method of claim 3, wherein:
said electronic service guide data comprises a service information, service extension information, arrangement information, content information and service parameter information; the electronic service guide data transmitted at one time is an entire or part of a data record in all or part of the electronic service guide data, and an electronic service guide data type identifier is used in a data header of a corresponding data unit to identify a type of the electronic service guide data carried in a data payload.

6. A method of claim 3, wherein:
said data unit comprises a data header, payload and cyclic redundancy check code, and in said step (b), when a data length of said electronic service guide message is larger than a maximum data payload length of said data unit, said electronic service guide data is divided into different data segments, and encapsulated and sent as different data segments using different data units, and a total number of segments divided and a segment serial number of the electronic service guide data in a local data unit are indicated in the data header of each data unit.

7. A method of claim 3, wherein:
in said step (b), the electronic service guide data is compressed and an encoding type used in the compression is indicated in said data header; in said step (d), said user equipments decode the electronic service guide data according to the encoding type.

8. A method of claim 3, wherein:
in said step (b), said electronic service guide data are divided into a plurality of electronic service guide data blocks which are distinguished by adding data block identifiers into an electronic service guide header, and rules for dividing the data blocks include dividing according to a play time, and the data payload of said data unit is used to transmit the electronic service guide data.

9. A method of claim 3, wherein:
a multiplexing period of said multiplexer is one second which is divided into 40 time slots, the multiplexing frame and time slot mapping in service and control logical channels are decided by a system configuration, and a range of said multiplexing frame identifier is from 0 to 39, and 39 is the maximum value, wherein, the multiplexing frame whose identifier is 0 is mapped to the control logical channel, while the other multiplexing frames are mapped to the service logical channel.

10. A method of claim 2, wherein:
a multiplexing payload of the multiplexing frame carrying a control information comprises one or more control information tables, each of the control information table comprises at least one said electronic service guide basic description table, said electronic service guide basic description table is applied to describe a configuration of multiplexing sub-frames which transmit the electronic service guide data.

11. A method of claim 10, wherein:

said electronic service guide basic description table comprises one or more of the following segments: table identifier, electronic service guide update serial number, segment length, segment serial number, the number of segments, network level, network number, local time offset, character encoding type, the number of electronic service guide service logical channels, electronic service guide service logical channel description, the number of electronic service guide data types, electronic service guide data type description and cyclic redundancy check_32.

12. A method of claim 10, wherein:

said electronic service guide service logical channel description comprises one or more of following segments: index identifier and electronic service guide service identifier; said electronic service guide data type description comprises one or more of following segments:

electronic service guide data type identifier, the number of data blocks and data block description.

13. A method of claim 10, wherein:

said data block description comprises one or more of following segments: data block identifier, data block version number and electronic service guide service logical channel index identifier.

14. A method of claim 10, wherein:

a multiplexing period of said multiplexer is one second which is divided into 40 time slots, the multiplexing frame and time slot mapping in service and control logical channels are decided by a system configuration, and a range of said multiplexing frame identifier is from 0 to 39, and 39 is the maximum value, wherein, the multiplexing frame whose identifier is 0 is mapped to the control logical channel, while other multiplexing frames are mapped to the service logical channel.

15. A method of claim 2, wherein:

said electronic service guide data are transmitted using the multiplexing frames in a service logical channel; or said electronic service guide data along with the electronic service guide basic description table are transmitted using the multiplexing frames in a control logical channel; or a part of electronic service guide data is transmitted using the multiplexing frames in the control logical channel, while a part of electronic service guide data is transmitted using the multiplexing frames in the service logical channel.

16. A method of claim 1, wherein:

a multiplexing period of said multiplexer is one second which is divided into 40 time slots, the multiplexing frame and time slot mapping in service and control logical channels are decided by a system configuration, and a range of said multiplexing frame identifier is from 0 to 39, and 39 is the maximum value, wherein, the multiplexing frame whose identifier is 0 is mapped to the control logical channel, while other multiplexing frames are mapped to the service logical channel.

17. A method of claim 1, wherein:

said electronic service guide data are transmitted using the multiplexing frames in a service logical channel; or said electronic service guide data along with the electronic service guide basic description table are transmitted using the multiplexing frames in a control logical channel; or a part of electronic service guide data is transmitted using the multiplexing frames in a control logical channel, while a part of electronic service guide data is transmitted using the multiplexing frames in a service logical channel.

* * * * *